(No Model.)
R. D. EMRICK.
GATE.
No. 560,124. Patented May 12, 1896.
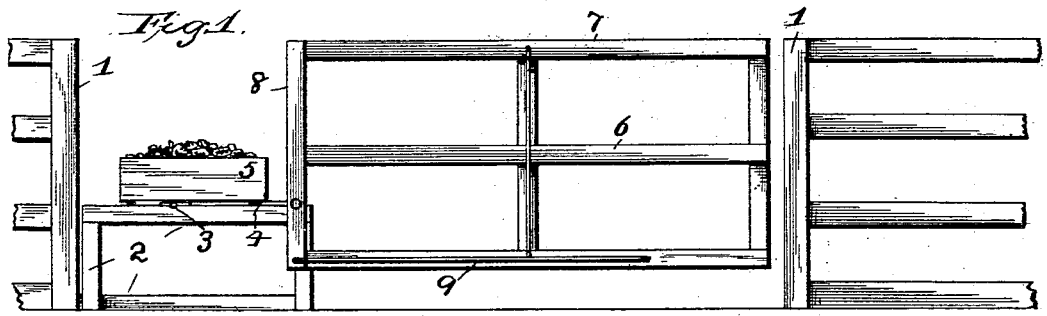
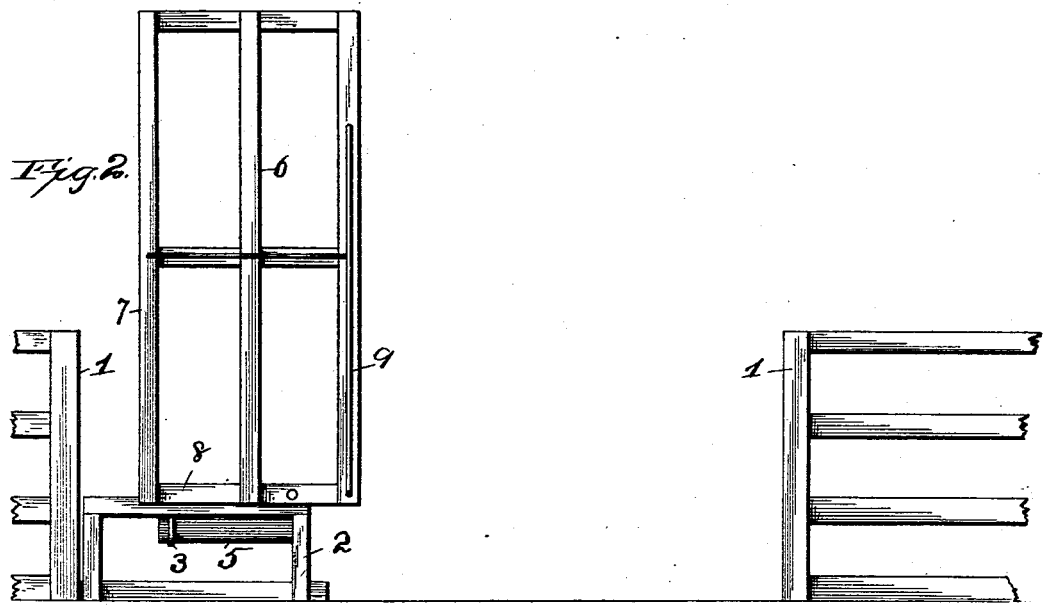
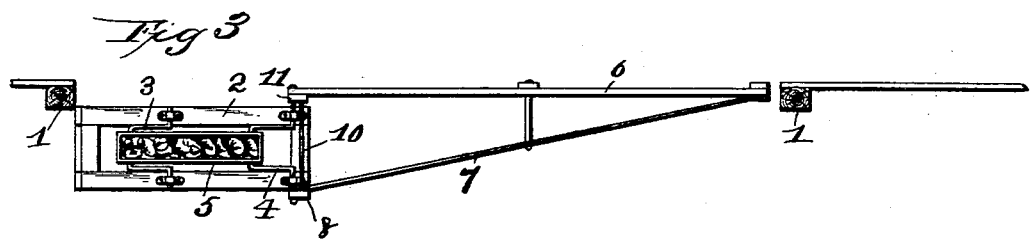
Witnesses:
E. C. Wurdeman
S. A. Williamson
Inventor
Reuben D. Emrick
by Geo. H. Holgate
Attorney

UNITED STATES PATENT OFFICE.

REUBEN D. EMRICK, OF NEWTONBURG, PENNSYLVANIA.

GATE.

SPECIFICATION forming part of Letters Patent No. 560,124, dated May 12, 1896.

Application filed August 13, 1895. Serial No. 559,132. (No model.)

*To all whom it may concern:*

Be it known that I, REUBEN D. EMRICK, a citizen of the United States, residing at Newtonburg, in the county of Clearfield and State of Pennsylvania, have invented certain new and useful Improvements in Gates, of which the following is a specification.

My invention relates to a new and useful improvement in gates, and has for its object to provide such a device which, when closed, will be perfectly secure and act as a perfect bar against the passage of cattle of all kinds and yet may be easily swung vertically in opening, and which shall be adapted to be moved from place to place and have no permanent connection with the fence in conjunction with which it works.

With these ends in view the invention consists in the details of construction and combination of elements hereinafter set forth and then specifically designated by the claims.

In order that those skilled in the art to which my invention appertains may understand how to make and use the same, I will describe its construction and operation in detail, referring by numbers to the accompanying drawings, forming a part of this specification, in which—

Figure 1 is a side elevation of my improved gate in position between the ends of a fence, showing it closed; Fig. 2, a similar view, the gate being opened; and Fig. 3, a plan view.

Similar numbers denote like parts in all the views of the drawings.

1 represents the end posts of a fence, between which it is desired to locate a gate, and 2 is a rectangular frame, to the upper rails of which are pivoted cranked axles 3 and 4, upon which rests a box or receptacle 5, by which said cranked axles are caused to move in unison, the box serving as a connecting-rod. This box is open at the top, so as to be filled with any material of sufficient weight for the purpose hereinafter set forth.

6 is a gate of any convenient construction, having the angle-rail 7 extending from its front end rearward and secured to the upright strip 8, which is braced at the bottom by the rod 9 and at the top by the cross-rod 10.

11 is an upright strip, to which the panels of the gate are secured, and this strip is parallel with the strip 8, and the two are secured to extensions of the crank-shaft 4, as shown in Fig. 3, so that any movement imparted to the gate will cause said crank-shaft to swing or any movement of the crank will cause said gate to swing.

From this description the operation of my improvement will be obviously as follows: The box 5, having been filled with stone or other material of sufficient weight to counterbalance the gate, any upward pressure upon the gate will cause the cranked portion of the shaft to swing vertically about its bearing, and as the box 5 acts as a connecting-rod between the crank-shafts 3 and 4 it will be seen that said box will be maintained in a horizontal position during its downward movement when the gate is being elevated. To close the gate, it is only necessary to grasp it and exert sufficient pressure to overcome the inertia of the box and its load, when the gate will be brought into a horizontal position. The position of the crank-shafts 3 and 4 may be so adjusted relative to the open and closed position of the gate as to hold said gate closed when lowered and hold it up when elevated, as will be readily understood; but in case it is desirable to cause the gate to automatically move upward by overbalancing it with the box and its load a latch may be provided, so as to engage with one of the end posts 1, whereby said gate will be held in its closed position against the tendency to move upward, so that it will be only necessary to withdraw the latch from engagement with the post, when the gate will rise without exertion upon the part of the operator.

As the gate and its operating mechanism have no connection whatever with the fence it will be seen that it may be moved from one place to another, which is especially advantageous in connection with portable fences, and as the heft of the material in the box for the purpose of counterbalancing the gate is so disposed as to be utilized in holding the frame 2 firmly upon the ground the gate and its connections will be enabled to resist any ordinary wind-pressure or side thrust brought to bear against it by cattle without being displaced; but should it be desirable to locate the gate more firmly than the weight of the material in the box will accomplish the frame 2 may be lashed or bolted to one of the posts 1, or it may be staked to the ground, thus making it as permanent in all respects as gates of ordinary construction.

One of the great advantages gained by the use of my improvement is that a gate cannot sag and drag upon the ground, as has heretofore been the case, and but little exertion is necessary to open or close it.

I do not wish to be limited to the exact construction shown and described, as it is obvious that the same may be varied without departing from the spirit of my invention.

Having thus fully described my invention, what I claim as new and useful is—

1. A gate, pivoted to a stationary frame, in combination with a pair of crank-shafts and a weighted receptacle resting upon said shafts whereby the weight of the gate is counterbalanced, as specified.

2. In a device of the character described, the gate 6, pivoted to the frame 2, in combination with the crank-shafts 3, and 4, and a receptacle 5, resting upon said shafts, substantially as and for the purposes set forth.

3. The herein-described combination of the gate 6, crank-shafts 3, and 4, to the latter of which is secured said gate, a receptacle 5, resting upon said shafts, and a frame 2, for supporting the operating parts of the device, as shown and for the purposes set forth.

In testimony whereof I have hereunto affixed my signature in the presence of two subscribing witnesses.

REUBEN D. EMRICK.

Witnesses:
D. M. FULTON,
HENRY BRETH.